Patented Dec. 22, 1953

2,663,734

UNITED STATES PATENT OFFICE 2,663,734

PREPARATION OF KETONE-DIARYLAMINE CONDENSATES

Ivan Mankowich, Naugatuck, Conn., assignor to United States Rubber Company, New York, N. Y., a corporation of New Jersey No Drawing. Application July 3, 1951,
Serial No. 235,106

5 Claims. (Cl. 260—576)

This invention relates to improvements in the preparation of the condensation products of aliphatic ketones and diarylamines.

The condensation products of aliphatic ketones with diarylamines, especially the condensation product of acetone with diphenylamine, and acetone with phenyl beta-naphthylamine have been sold widely as rubber antioxidants. Ordinarily, these have been prepared in the presence of an acidic catalyst such as iodine, ferrous iodide, hydriodic acid, hydrogen bromide, zinc chloride, calcium chloride, etc.

It has now been found that the condensation of aliphatic ketones and diarylamines can be promoted by a halogenated aldehyde or acetal (open-chain or cyclic), the halogen having an atomic weight of at least approximately 35.

Exemplary of such chemical promoters are chloral, bromal, o-chlorobenzaldehyde, diethyl acetal of iodo acetaldehyde, diethyl acetal of beta-chloro acetaldehyde, chloral hydrate, o-bromo benzaldehyde, and 2,4-dimethyl 2-chloromethyl dioxolane.

An excess of either ketone or amine can be used, or they can be reacted in equimolecular proportions. It is preferred, however, to have the ketone in excess.

The amount of the promoter to be used can vary from 0.03 to 10% or better, but is preferably 0.05 to 5.0% of the weight of the diarylamine, and will depend on:

1. The nature of the promoter, the diarylamine, and the ketones.
2. The time cycle of production.
3. The temperature of reaction.
4. The desired viscosity of the product.
5. The range of proportions of the ketone and the diarylamine.

The reaction initiator may be added as such, or dissolved in the ketone, or in the diarylamine, before the reactants are brought to reaction temperature, or, alternately, the mixture of the reactants may be brought to temperature before the addition of the promoter via injection. Furthermore, mixtures of the promoters may be used. Another variation is the concurrent addition of the reactants to a heated reaction zone.

It is well-known that the reaction of an aliphatic ketone and a diarylamine can be carried out by reflux, by passage of ketone vapor through the amine, and by autoclaving of the reactants at 140° C. upwards. The promoters of this invention are applicable to all these methods.

While the use of the present reaction promoters is primarily intended in the systems, acetone-diphenylamine, and acetone-phenyl beta-naphthylamine, other aliphatic ketone-diarylamine systems, such as:

Acetone-phenyl alpha-naphthylamine
Acetone-phenyl-p-tolylamine
Acetone-di-p-tolylamine
Methyl ethyl ketone-diphenylamine
Methyl ethyl ketone-phenyl-b-naphthylamine
Methyl ethyl ketone-phenyl xenylamine
Methyl ethyl ketone-phenyl-a-naphthylamine may be used, and are also subject to reaction initiation, by the promoters of this invention.

Example

In the following table, runs in sealed glass tubes are described. In each case 59.6 gr. diphenylamine and 39.7 gr. acetone were used. The general conditions of reaction were six hours at 240°–250° C. In each case, the glass tube, after cooling, was opened and the reaction freed of unreacted acetone, water, etc. by drying at ca. 5 mm. to 150° C.

| Run No. | Catalyst | Amount in grams | Gram Yield of condensation product | Condensate viscosity (poises at 30° C.) |
|---|---|---|---|---|
| 1 | Bromal | 0.203 | 76.0 | 1,315 |
| 2 | o-Chloro benzaldehyde | 0.305 | 67 | 41 |
| 3 | Diethylacetal of beta-chloro acetaldehyde | 0.331 | 73.7 | 98 |
| 4 | 2,4-dimethyl 2-chloromethyl dioxolane | 0.327 | 73.1 | 137 |

Having thus described my invention, what I claim and desire to protect by Letters Patent is:

1. In a method of preparing a composite product of condensation of an aliphatic ketone and a diarylamine, the improvement which consists in adding to the reaction mix a chemical promoter which is selected from the class consisting of chloral, bromal, o-chlorobenzaldehyde, diethyl acetal of iodo acetaldehyde, diethyl acetal of beta-chloro acetaldehyde, choral hydrate, o-bromo benzaldehyde, and 2,4-dimethyl 2-chloromethyl dioxolane, and heating the mix in the presence of said promoter.

2. In a method of preparing a composite product of condensation of an aliphatic ketone and a diarylamine, the improvement which consists in adding to the reaction mix a chemical promoter which is bromal.

3. In a method of preparing a composite product of condensation of an aliphatic ketone and a diarylamine, the improvement which consists in adding to the reaction mix a chemical promoter which is o-chloro benzaldehyde.

4. In a method of preparing a composite product of condensation of an aliphatic ketone and a diarylamine, the improvement which consists in adding to the reaction mix a chemical promoter which is diethylacetal of beta-chloro acetaldehyde.

5. In a method of preparing a composite product of condensation of an aliphatic ketone and a diarylamine, the improvement which consists in adding to the reaction mix a chemical promoter which is 2,4-dimethyl 2-chloromethyl dioxolane.

IVAN MANKOWICH.

References Cited in the file of this patent

UNITED STATES PATENTS

| Number | Name | Date |
|---|---|---|
| 1,935,279 | ter Horst | Nov. 14, 1933 |
| 2,160,223 | Meuser et al. | May 30, 1939 |